(12) United States Patent
Mueller

(10) Patent No.: US 6,481,478 B2
(45) Date of Patent: Nov. 19, 2002

(54) MOTORCYCLE GAS TANK FILL PROTECTOR

(76) Inventor: Robert A. Mueller, N74 W22285 Alta Vista Dr., Sussex, WI (US) 53089

( * ) Notice: Subject to any disclaimer, the term of this patent is extended or adjusted under 35 U.S.C. 154(b) by 0 days.

(21) Appl. No.: 09/825,388

(22) Filed: Apr. 3, 2001

(65) Prior Publication Data
US 2002/0139806 A1 Oct. 3, 2002

(51) Int. Cl.[7] .............................. A65D 65/02
(52) U.S. Cl. ........................ 150/167; 280/770
(58) Field of Search ..................... 150/154–168; 280/770, 830; 296/136

(56) References Cited

U.S. PATENT DOCUMENTS

| | | | |
|---|---|---|---|
| 2,659,523 A | | 11/1953 | Comber ............... 226/129 |
| 4,810,015 A | * | 3/1989 | McNeil ................ 150/166 |
| 4,835,505 A | * | 5/1989 | Hattori et al. ......... 335/284 |
| 4,849,272 A | * | 7/1989 | Haney et al. .......... 280/770 |
| 5,490,549 A | | 2/1996 | Biette ................. 150/167 |
| 5,884,380 A | | 3/1999 | Thrum ................ 29/401.1 |
| 5,944,347 A | * | 8/1999 | Pechman .............. 150/166 |
| 6,062,601 A | * | 5/2000 | Willie et al. ........... 150/167 |

* cited by examiner

Primary Examiner—Stephen P. Garbe
Assistant Examiner—Lien Ngo
(74) Attorney, Agent, or Firm—Donald J. Ersler

(57) ABSTRACT

A motorcycle gas tank fill protector preferably includes a nonscratch sheet, a protective sheet, and at least one magnet. The at least one magnet is contained between the nonscratch sheet and the protective sheet. A gas opening is formed through the nonscratch and protective sheets at one end thereof. The nonscratch sheet and protective sheet are preferably attached to each other on the outer perimeters thereof and the perimeter of the gas opening. The nonscratch and protective sheets may be attached to each other with stitching, sonic welding, heat sealing, or any other suitable assembly method. The at least one magnet is preferably captured within the nonscratch and protective sheets by stitching around the at least one magnet, but other methods may also be used. The motorcycle gas tank fill protector is preferably used by first removing the gas cap from the gas tank. The motorcycle gas tank fill protector is placed over the motorcycle gas tank such that the gas opening aligns with the gas spout in the gas tank. The motorcycle gas tank fill protector is removed after filing the gas tank. The motorcycle gas tank fill protector may be folded and stored in a pouch or pocket.

16 Claims, 2 Drawing Sheets

MOTORCYCLE GAS TANK FILL PROTECTOR

BACKGROUND OF THE INVENTION

1. Field of the Invention

The present invention relates generally to motorcycle gas tanks and more specifically to a motorcycle gas tank fill protector which prevents gasoline from damaging the finish on a motorcycle gas tank.

2. Discussion of the Prior Art

It appears that no commercially available foldable device exists for temporarily covering the top surface of a motorcycle gas tank while filling thereof with gasoline. U.S. Pat. No. 5,490,549 to Beitte discloses a device which covers the top and sides of a motorcycle gas tank. U.S. Pat. No. 5,884,830 to Thurm discloses a motorcycle gas tank cover for cosmetically altering the appearance of a motorcycle gas tank. U.S. Pat. No. 2,659,523 to Comber discloses a heavy nonfoldable protective bib used to cover an automobile fender.

Accordingly, there is a clearly felt need in the art for a motorcycle gas tank fill protector which temporarily covers only a necessary portion of a motorcycle gas tank, may be folded for insertion into a pouch, and may be easily attached to the motorcycle gas tank without tools.

SUMMARY OF THE INVENTION

The present invention provides a motorcycle gas tank fill protector which may be easily attached to a gas tank and folded to a compact size. The motorcycle gas tank fill protector preferably includes a nonscratch sheet, a protective sheet, and at least one magnet. The at least one magnet is contained between the nonscratch sheet and the protective sheet. A gas opening is formed through the nonscratch and protective sheets at one end thereof. The nonscratch sheet and protective sheet are preferably attached to each other on the outer perimeters thereof and the perimeter of the gas opening. The nonscratch and protective sheets may be attached to each other with stitching, sonic welding, heat sealing, adhesive or any other suitable assembly method. The at least one magnet is preferably captured within the nonscratch and protective sheets by stitching around the at least one magnet, but other methods of constraint may also be used.

The motorcycle gas tank fill protector is preferably used in the following manner. The gas cap is removed from the gas tank. The motorcycle gas tank fill protector is placed over the gas tank such that the gas opening aligns with the opening in the gas tank. The area over the at least one magnet is pressed against the gas tank, if contact was not intitally made. The gas tank is filled with gas and the motorcycle gas tank fill protector removed. The motorcycle gas tank fill protector may be folded and inserted into a pouch or pocket.

Accordingly, it is an object of the present invention to provide a motorcycle gas tank fill protector which may be attached to a motorcycle gas tank without tools.

Finally, it is another object of the present invention to provide a motorcycle gas tank fill protector which may be folded into a smaller size for storage in a pouch or pocket.

These and additional objects, advantages, features and benefits of the present invention will become apparent from the following specification.

DETAILED DESCRIPTION OF THE PREFERRED EMBODIMENTS

Figure 1:
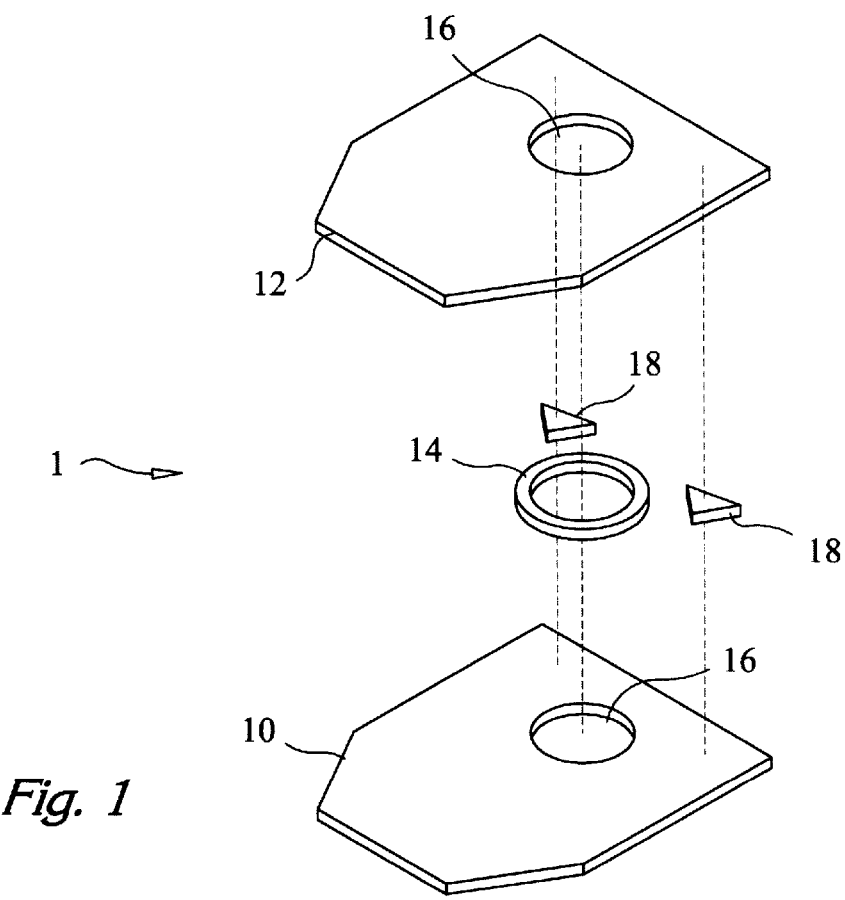
FIG. 1 is an exploded perspective view of a motorcycle gas tank fill protector in accordance with the present invention.
Figure 2:
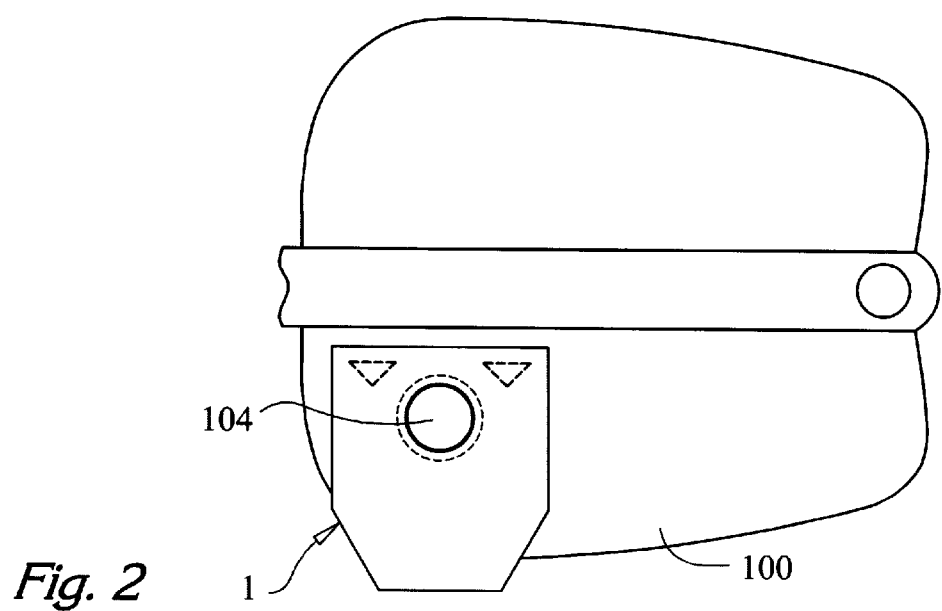
FIG. 2 is a top view of a motorcycle gas tank fill protector attached to a motorcycle gas tank in accordance with the present invention.
Figure 3:
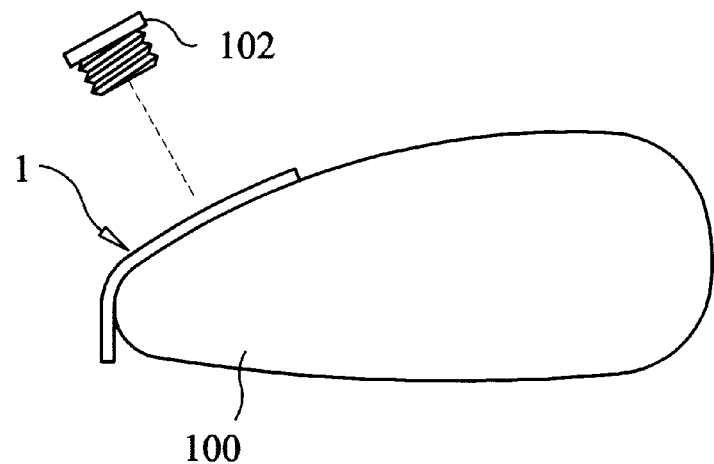
FIG. 3 is a side view of a motorcycle gas tank fill protector installed on a motorcycle gas tank in accordance with the present invention.

With reference now to the drawings, and particularly to FIG. 1, there is shown a perspective view of a motorcycle gas tank fill protector 1. With reference to FIGS. 2–3, the motorcycle gas tank fill protector 1 includes a nonscratch sheet 10, a protective sheet 12, and at least one magnet 14. The at least one magnet 14 is contained between the nonscratch sheet 10 and the protective sheet 12. A gas opening 16 is formed through the nonscratch sheet 10 and the protective sheet 12 at one end thereof. The nonscratch sheet 10 and protective sheet 12 are preferably attached to each other on the outer perimeters thereof and on the perimeter of the gas opening. The outer perimeters of the sheets 10, 12 may have any suitable shape. The nonscratch sheet 10 and protective sheet 12 may be attached to each other with stitching, sonic welding, heat sealing, adhesive, or any other suitable assembly method. The nonscratch sheet 10 is fabricated from a material which will not scratch paint or a protective coating. The protective sheet 12 is preferably fabricated from a material which has an attractive appearance. Both the nonscratch and protective sheet must be fabricated from a material which does not react with gasoline or damaged thereby. A single sheet of material may be substituted for the nonscratch and protective sheets which has an attractive top surface and a nonscratch bottom surface. A bottom of any magnet would also have a nonscratch surface. The magnet would be attached to the nonscratch bottom surface.

The at least one magnet 14 is preferably a ring magnet having an inner perimeter which is greater than the gas opening 16. However, different or additional magnets 18 may also be used. The different or additional magnets 18 would have any suitable shape and would be located in other areas of the motorcycle gas tank fill protector 1. However, the different or additional magnets 18 are preferably disposed at the same end as the gas opening 16. The magnets 14, 18 are preferably fabricated from a thin flexible material such as plastic bonded ferrite, but other magnet materials or substances having magnetic properties may also be used. The magnets 14, 18 are preferably captured within the nonscratch and protective sheets by stitching around thereof, but other retention methods may also be used such as gluing the magnets 14, 18 to the sheet(s) with adhesive.

Figure 4:
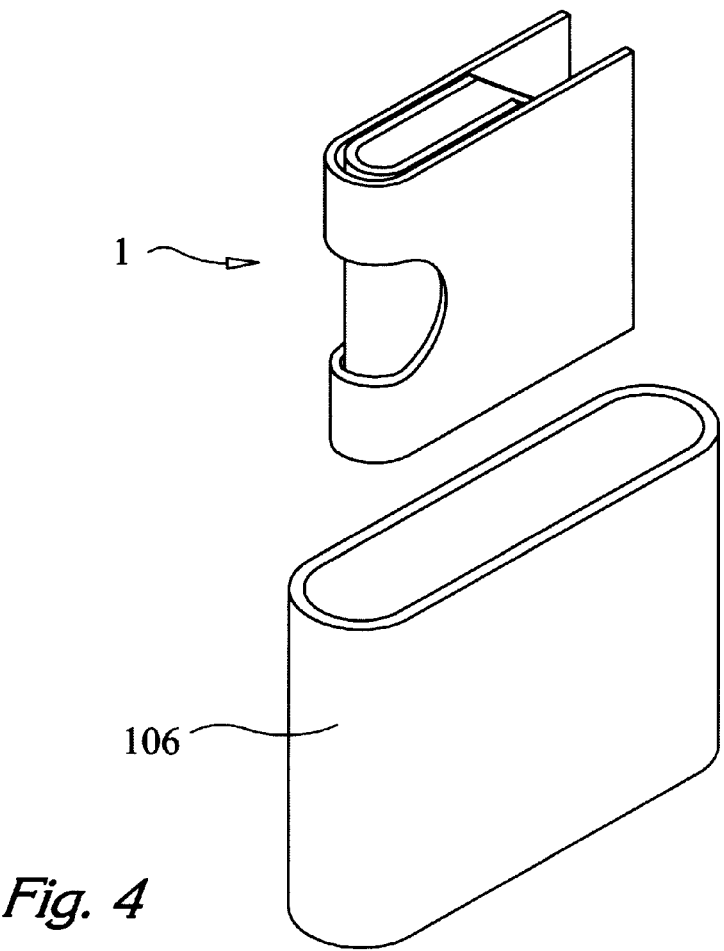
FIG. 4 is a perspective view of a motorcycle gas tank fill protector folded before insertion into a pocket in accordance with the present invention.

The motorcycle gas tank fill protector 1 is preferably used in the following manner. The gas tank cap 102 is removed from the motorcycle gas tank 100. The motorcycle gas tank fill protector 1 is placed over the motorcycle gas tank 100 such that the gas opening 16 aligns with the gas spout 104 in the gas tank 100. The respective areas over the magnets 14, 18 are pressed against a top surface of the motorcycle gas tank 100, if contact was not intitally made. The gas tank 100 is filled with gas and the motorcycle gas tank fill protector 1 removed. With reference to FIG. 4, the motorcycle gas tank fill protector 1 may be folded and inserted into a pouch 106 or pocket.

Use of the motorcycle gas tank fill protector 1 should not be limited to use with a motorcycle gas tank only, but should include any type of gas tank which the motorcycle gas tank fill protector 1 may protect.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A gas tank fill protector capable of being attached to a gas tank comprising:

a nonscratch sheet;

a protective sheet; and at least one magnet being inserted between said nonscratch and protective sheets, said nonscratch and protective sheets being attached to each other, a gas opening being formed through said nonscratch and protective sheets, said gas opening being sized to fully protect the paint surrounding a gas spout in the gas tank; and said at least one magnet being a ring magnet, said ring magnet having an inner perimeter which is greater than that of said gas opening, said ring magnet being disposed around said gas opening.

2. The gas tank fill protector capable of being attached to a gas tank of claim 1, wherein:

at least one additional magnet being inserted between said nonscratch and protective sheets.

3. The gas tank fill protector capable of being attached to a gas tank of claim 1, wherein:

said nonscratch sheet being attached to said protective sheet on an outer perimeter thereof with stitching and on a perimeter of said gas opening with stitching.

4. The gas tank fill protector capable of being attached to a gas tank of claim 3, wherein:

said at least one magnet being constrained from movement by stitching around an outer perimeter thereof.

5. The gas tank fill protector capable of being attached to a gas tank of claim 1, wherein:

said nonscratch sheet is fabricated from a material which will not scratch paint or a protective coating on a gas tank.

6. The gas tank fill protector capable of being attached to a gas tank of claim 1, wherein:

said protective sheet being fabricated from a material which will not react with gasoline or be damaged thereby.

7. A gas tank fill protector capable of being attached to a gas tank comprising:

a single sheet of material having a gas opening formed through thereof, said gas opening being sized to fully protect the paint surrounding a gas spout in the gas tank, a nonscratch surface being formed on one side of said single sheet of material, a protective surface being formed on the other side of said single sheet of material; and at least one magnet being attached to said nonscratch surface, said at least one magnet having a nonscratch surface on a bottom thereof; and said at least one magnet being a ring magnet, said ring magnet having an inner perimeter which is greater than that of said gas opening, said ring magnet being disposed around said gas opening.

8. The gas tank fill protector capable of being attached to a gas tank of claim 7, wherein:

at least one additional magnet being inserted between said nonscratch and protective sheets.

9. The gas tank fill protector capable of being attached to a gas tank of claim 7, wherein:

said nonscratch surface not scratching or abrading paint or a protective coating on a gas tank.

10. The gas tank fill protector capable of being attached to a gas tank of claim 7, wherein:

said single sheet material not reacting with gasoline or being damaged thereby.

11. The gas tank fill protector capable of being attached to a gas tank of claim 1 wherein:

said gas tank fill protector capable of being folded for insertion into a pouch or a pocket.

12. The gas tank fill protector capable of being attached to a gas tank of claim 7 wherein:

said gas tank fill protector capable of being folded for insertion into a pouch or a pocket.

13. A gas tank fill protector capable of being attached to a gas tank comprising:

a single sheet of material having a gas opening being formed through thereof, said gas opening being sized to fully protect the paint surrounding a gas spout in the gas tank, a nonscratch surface being formed on one side of said single sheet of material, a protective surface being formed on the other side of said single sheet of material; and at least one magnet being attached to said nonscratch surface, said at least one magnet having a nonscratch surface on a bottom thereof, said gas tank fill protector capable of being folded for insertion into a pouch or pocket; and said at least one magnet being a ring magnet, said ring magnet having an inner perimeter which is greater than that of said gas opening, said ring magnet being disposed around said gas opening.

14. The gas tank fill protector capable of being attached to a gas tank of claim 13, wherein:

at least one additional magnet being inserted between said nonscratch and protective sheets.

15. The gas tank fill protector capable of being attached to a gas tank of claim 13, wherein:

said nonscratch surface not scratching or abrading paint or a protective coating on a gas tank.

16. The gas tank fill protector capable of being attached to a gas tank of claim 13, wherein:

said single sheet material not reacting with gasoline or being damaged thereby.

\* \* \* \* \*